US008823324B2

(12) United States Patent
Brandon, II

(10) Patent No.: US 8,823,324 B2
(45) Date of Patent: Sep. 2, 2014

(54) STAGGERED MULTI-BATTERY BATTERY CHARGING

(75) Inventor: Michael J. Brandon, II, North Ridgeville, OH (US)

(73) Assignee: Eveready Battery Company, Inc., St. Louis, MO (US)

( * ) Notice: Subject to any disclaimer, the term of this patent is extended or adjusted under 35 U.S.C. 154(b) by 97 days.

(21) Appl. No.: 12/973,964

(22) Filed: Dec. 21, 2010

(65) Prior Publication Data

US 2011/0121790 A1 May 26, 2011

Related U.S. Application Data

(63) Continuation of application No. PCT/US2008/007938, filed on Jun. 26, 2008.

(51) Int. Cl.
*H02J 7/00* (2006.01)
*H02J 7/14* (2006.01)
*H01M 10/44* (2006.01)
*H01M 10/052* (2010.01)
*H01M 10/48* (2006.01)

(52) U.S. Cl.
CPC ............. *H02J 7/0003* (2013.01); *H02J 7/0006* (2013.01); *H02J 7/0004* (2013.01); *H01M 10/052* (2013.01); *H01M 10/48* (2013.01); *H02J 7/0021* (2013.01); *H02J 7/0008* (2013.01); *H02J 7/0013* (2013.01); *H01M 10/44* (2013.01); *Y02T 10/7055* (2013.01)
USPC ........... 320/125; 320/107; 320/124; 320/127; 320/126; 320/160

(58) Field of Classification Search
USPC ......... 320/125, 160, 104, 107, 108, 110, 126, 320/127, 124, 112, 113, 114, 115
See application file for complete search history.

(56) References Cited

U.S. PATENT DOCUMENTS

| 5,565,756 | A | * | 10/1996 | Urbish et al. | 320/103 |
| 5,686,815 | A | * | 11/1997 | Reipur et al. | 320/116 |
| 5,723,970 | A | * | 3/1998 | Bell | 320/140 |
| 5,726,551 | A | * | 3/1998 | Miyazaki et al. | 320/124 |
| 5,734,253 | A | * | 3/1998 | Brake et al. | 320/125 |

(Continued)

FOREIGN PATENT DOCUMENTS

| KR | 10-1998-0076078 A | 11/1998 |
| KR | 10-2001-0035670 A | 5/2001 |
| KR | 10-2002-0087754 A | 11/2002 |
| KR | 10-2002-0090920 A | 12/2002 |

OTHER PUBLICATIONS

Patent Cooperation Treaty (PCT), International Search Report and Written Opinion for Application No. PCT/US2008/007938, filed Jun. 26, 2008, mailed Mar. 18, 2009, Korean Intellectual Property Office, Republic of Korea.

*Primary Examiner* — Edward Tso
*Assistant Examiner* — Alexis A Boateng
(74) *Attorney, Agent, or Firm* — Russell H. Joye, Jr.

(57) ABSTRACT

A battery charging method includes generating a plurality of charge profiles, each for a different one of a plurality of batteries, wherein a charge profile indicates a charge current as a function of charge time, and at least two of the charge profiles have a different charge current at a same charge time, and concurrently charging each of the plurality of batteries based on a corresponding charge profile.

20 Claims, 2 Drawing Sheets

(56) References Cited

U.S. PATENT DOCUMENTS

| | | | |
|---|---|---|---|
| 5,808,442 A * | 9/1998 | Kaite et al. | 320/125 |
| 5,955,868 A * | 9/1999 | Kaite et al. | 320/119 |
| 5,986,433 A * | 11/1999 | Peele et al. | 320/125 |
| 6,037,751 A * | 3/2000 | Klang | 320/160 |
| 6,100,668 A * | 8/2000 | Takano | 320/148 |
| 6,104,165 A * | 8/2000 | Miyamoto et al. | 320/125 |
| 6,424,120 B1 * | 7/2002 | Chen | 320/125 |
| 6,459,237 B1 * | 10/2002 | Bausch | 320/125 |
| 6,522,102 B1 * | 2/2003 | Cheiky et al. | 320/125 |
| 6,573,687 B2 * | 6/2003 | Kimura et al. | 320/132 |
| 7,208,917 B2 * | 4/2007 | Yang | 320/160 |
| 7,605,566 B2 * | 10/2009 | Jones | 320/134 |
| 7,994,754 B2 * | 8/2011 | Seo | 320/119 |
| 8,138,726 B2 * | 3/2012 | Partin et al. | 320/160 |
| 8,198,856 B2 * | 6/2012 | Koide et al. | 320/106 |
| 2001/0010456 A1 * | 8/2001 | Kaite et al. | 320/125 |
| 2006/0226810 A1 * | 10/2006 | Yang | 320/116 |
| 2007/0236225 A1 * | 10/2007 | Tsenter et al. | 324/426 |
| 2008/0303482 A1 * | 12/2008 | Yang et al. | 320/125 |
| 2009/0021222 A1 * | 1/2009 | Kudo et al. | 320/160 |
| 2009/0289603 A1 * | 11/2009 | Mahowald | 320/151 |

* cited by examiner

STAGGERED MULTI-BATTERY BATTERY CHARGING

RELATED APPLICATIONS

This application is a continuation of International Application No. PCT/2008/007938, filed Jun. 26, 2008.

TECHNICAL FIELD

The following generally relates to charging batteries, and more particular to charging two or more batteries, using a different charge profile for at least two of the batteries.

BACKGROUND

A conventional multi-battery battery charger typically charges the batteries inserted therein using the same charge profile. To illustrate this, an example in which two batteries are charged is discussed next in connection with FIGS. 1, 2 and 3, which respectively show individual and aggregate charge profiles for a prior art technique in which Batteries A and B, each with a charge capacity of twenty-four hundred (2400) milliamp hours (mAh), are concurrently charged for thirty (30) minutes. In FIGS. 1-3, the x-axis represents the charge time in units of minutes, the y-axis represents the charging current in units of Amperes (A), and the curves represent the charge profiles, or the charging current as a function of the charge time.

From these figures, initially eight (8) A of current is supplied to charge Battery A (FIG. 1) and eight (8) A of current is supplied to charge Battery B (FIG. 2) during a first charging stage. The charging current for both of the Batteries A and B is then decreased together to four (4) A at the ten (10) minute mark for a second charging stage and to 2 (2) A at the twenty (20) minute mark for a third charging stage. The charging current at the beginning of charging typically is higher and decreases as the batteries charge due to the increases in battery temperature as the battery charges. Unfortunately, this technique requires the battery charger to draw at least sixteen (16) A of current (FIG. 3) when charging begins to fully charge both batteries (forty-eight hundred 4600 mAh in thirty (30) minutes), and the cost of the charging circuitry generally follows the maximum current draw of the charging circuitry.

In addition to the above, battery temperature is also controlled by cycling or pulsing the charging current, for example, using a duty cycle of fifty percent (50%) wherein for each pulse the charging current is supplied 50% of the time and not supplied the other 50% of the time. Unfortunately, this results in periods of time when neither of the Batteries A and B are being charged, leading to charging inefficiencies.

SUMMARY

Aspects of the application address the above matters, and others.

In one aspect, battery charging includes generating a plurality of charge profiles, each for a different one of a plurality of batteries, wherein a charge profile indicates a charge current as a function of charge time, and at least two of the charge profiles have a different charge current at a same charge time, and concurrently charging each of the plurality of batteries based on a corresponding charge profile.

In another aspect, a battery charger includes a battery charge profile generator that generates a different charge profile for each of a plurality of batteries to be charged, wherein at least two of the charge profiles are staggered in that they include charge current profiles that differ from each other over time, and charging circuitry that concurrently charges batteries based on respective generated charge profiles.

In another aspect, a battery charger includes charging circuitry that concurrently charges two or more batteries based on individual unique charge profiles.

Those skilled in the art will recognize still other aspects of the present application upon reading and understanding the attached description.

BRIEF DESCRIPTION OF THE DRAWINGS

The application is illustrated by way of example and not limitation in the figures of the accompanying drawings, in which like references indicate similar elements and in which.

DETAILED DESCRIPTION

As used herein, the term battery includes a configuration of one or more energy storage devices (e.g., electrochemical cells, capacitors, etc.) in series, parallel, or both, including a battery pack of two or more sets of cells or sets of batteries in series, parallel, or both.

Figure 4:
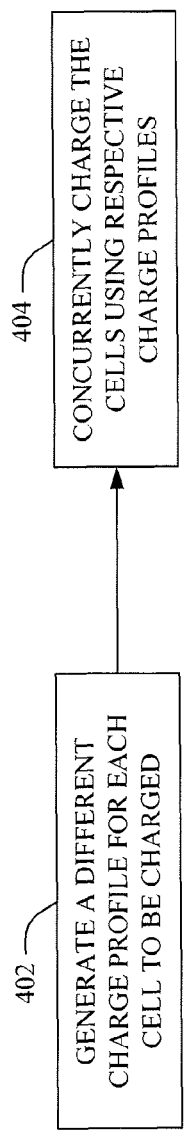
FIG. 4 illustrate an example battery charging method using staggered battery charge profiles.

FIG. 4 illustrates a method for charging one or more batteries (rechargeable or secondary batteries). At 402, a different charge profile is generated for at least two batteries to be charged, rendering a staggered charge profile configuration in that at least two charge profiles include charge current curves that differ from each other as a function of charge time. Such charge profiles may include a charging current that fluctuates (decreases and increases) over the charge interval based on various factors.

Examples of suitable factors include, but are not limited to, one or more of the charge capacity of each battery, the charge state of each battery, the charge time for each battery, a power draw of the charger, the number of batteries being charged, the temperature of each battery, a user defined charging parameter, etc. In one instance, the charge profile for each battery is optimized, based on the various factors, for example, for charging efficiency. As described in greater detail below, using unique or different charge profiles may decrease the power draw of the charger, decreasing cost, and efficiently charging the batteries, for example, by continuously charging each battery, while adjusting the charging current for each battery in light of temperature and/or other considerations.

At 404, the charge profiles are used to concurrently selectively charge the one or more batteries being charged. It is to be appreciated that one or more of the charge profiles can be changed while charging the one or more batteries. For instance, a battery may be removed and/or a battery may be added, which may affect one or more of the charge profiles. In another instance, the state of a battery may transition to an unanticipated state (charged faster or slower than expected, short circuited, etc,), which may result in a change to one or more of the charge profiles. In addition, one or more of the charge profiles may be changed for energy efficiency purposes.

As discussed herein, each charge profile is based on various factors. In one instance, each charge profile is based on the following equation:

$$CC(t)=CC*(A(t)*B(t)* \ldots) \quad \text{Equation 1}$$

wherein CC(t) is the charge current for a charge profile as a function of time (t), CC is a charge current made available, A(t) is a first factor as a function of time, B(t) is a second factor as a function of time, etc., and the charge profiles aggregately satisfy the following equation:

$$AggCC(t)=CC_1(t)+CC_2(t)+\ldots+CC_N(t), \quad \text{Equation 2}$$

wherein AggCC(t) is the aggregate charge current at any time t of N individual charge currents supplied to N individual active battery charging channels. Where only one battery is to be charged and the factors (A, B, ...) are omitted, and CC is the charge current made available for charging batteries, AggCC(t)=CC(t)=the charge current made available for charging batteries. Wherein multiple batteries are to be charged, the aggregate charge current is less than or equal to a maximum available charge current. Various embodiments are described next.

In one embodiment, $A_N(t)$ is a scaling factor which weights or scales the charge current supplied to each active channel based on the number of active channels. As such, $A_N(t)$ can be determined as 1/(number of active charge channels). Thus, if two of the charge channels are active and being used to charge batteries, then $A_1(t)$ and $A_2(t)$ are each ½, and the charge current supplied to each of the charge channels is $CC_1(t)=CC_2(t)=CC*(½)$. If three of the charge channels are used to charge batteries, then $A_1(t)$, $A_2(t)$ and $A_3(t)$ are each ⅓, and the charge current supplied to each of the charge channels is $CC_1(t)=CC_2(t)=CC_3(t)=CC*(⅓)$. $A_N(t)$ can also be weighted such that in the two battery case $A_1(t) \neq A_2(t)$ and $A_1(t)+A_2(t) \leq 1$. The number of active channels can be automatically determined by sensing when a battery is inserted into and/or removed from a battery charging bay and/or manually entered.

In another instance, $A_N(t)$ is based on a state of charge (SOC) of the Nth battery, or 1-% capacity. As such, a discharged Nth battery will receive charge current $CC_N(t)$, a partially charged Nth battery will receive a fraction of charge current $CC_N(t)$ based on its current charge state, and a charged Nth battery will not be charged. Various approaches can be used to determine the state of charge including, but not limited to, determining the SOC based on a closed circuit voltage (CCV), an open circuit voltage (OCV), etc.

In another instance, $A_N(t)$ is a scaling factor that based on a temperature of the corresponding battery, a neighboring battery, or a combination thereof. In one example, the scaling factor is obtained from a look up table (LUT) or the like, which maps a weight to a range of battery temperatures. For instance, an example scaling factor may be one (1) at twenty-five (25) degrees Celsius (° C.), zero (0) at sixty (60)° C., and X between twenty-five (25) and at sixty (60)° C., wherein X is >0 and <1. Upon determining the battery temperature, for example, via a thermocouple, a thermister, or the like, a corresponding weight can be obtained from the LUT. It is to be appreciated that such relationship between the temperature and the weigh may be linear or non-linear. In another instance, the scaling factor is determined through the expansion of an equation describing the mapping. The temperature of a neighboring charging battery may additionally or alternatively be used.

In another instance, $A_N(t)$ is a scaling factor based on a charging priority. For example, it may be desirable to charge a subset of a plurality of batteries being charged faster than other ones of the plurality of batteries. For example, a user may fill some or all of the battery bays (e.g., eight (8)) with batteries, desiring to use a subset (e.g., two (2)) of the batteries. In one embodiment, the bays may be pre-prioritized so that simply inserting a battery into a bay sets the priority. By way of example, bay 1 may be associated with P=1, whereas bay 5 is associated with a lower priority of P=0.25. For batteries with equal % capacity, using this prioritization, the battery in bay 1 will be charge prior to the battery in bay 5. Of course, the default priority can be overridden. In another embodiment, the priority is manually set, for example, by the user, by the order in which the batteries are inserted into the charger, by a delay between the insertion of the batteries, through a signal provided to the charge, and/or otherwise.

In another one instance, $A_N(t)$ is a weighting factor used to load balance power consumption, for example, based on the time of day, day of the week, the month of the year, etc. For example, a charge profile can be generated taking into account whether charging is taking place during the middle of the day when power consumption is relatively higher or during the night when power consumption is relatively lower. Such a weighting factor can be pre-set or manually set.

In another instance, a combination of the above may be used. For instance, consider an example in which all of the above factors are used and two batteries are being charged, $A_1(t)$ and $A_2(t)$ are equal to ½, $B_1(t)$ and $B_2(t)$ have respective percent capacities of 0.2 and 0.75, and $C_1(t)$ and $C_2(t)$ respectively are 0.9 and 0.45 based on their respective temperatures, $D_1(t)$ and $D_2(t)$ respectively set for a priority of 0.5 and 1, and $E_1(t)$ and $E_2(t)$ are equal and set to 1. For this example, assuming an available charge current (AvCC) of 12 amps, the initial charge current supplied to each battery is 0.540 amps (or 12*½*0.2*0.9*0.5*1) and 2.025 (or 12*½*0.75*0.45*1*1). These values will fluctuate over time as the battery charges, heats up, etc., as batteries are removed from and/or inserted in the charger, etc.

Of course, one or more of the factors may be omitted, which would change the charge current supplied. For instance, if priority was not a concern, the charge current supplied to each battery would be 1.080 amps (or 12*½*0.2*0.9*1) and 2.025 (or 12*½*0.75*0.45*1), using the above example parameters. If only the number of active bays were taken into account, the charge current supplied to each battery would be 6 amps. One of ordinary skill would recognize that various other combinations of these factors, including additional factor and/or a subset of these factors, can alternatively be used.

Figure 1:
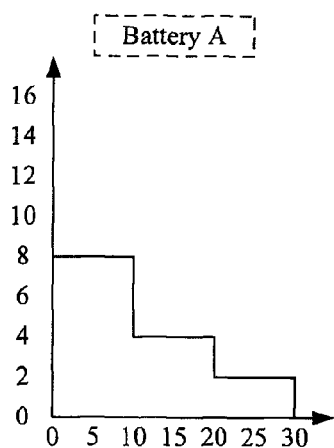
FIG. 1 illustrates a first prior art charge profile.
Figure 2:
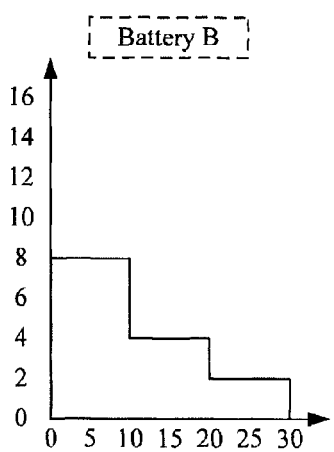
FIG. 2 illustrates a second prior art charge profile.
Figure 3:
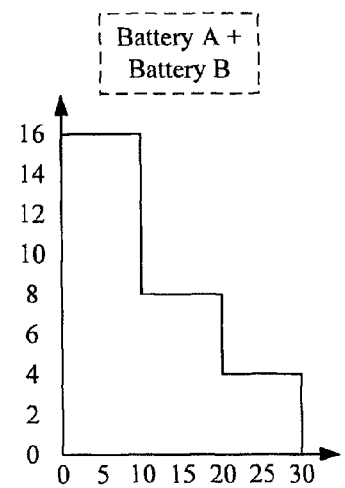
FIG. 3 illustrates an aggregation of the first and second prior art charge profiles from FIGS. 1 and 2.
Figure 5:
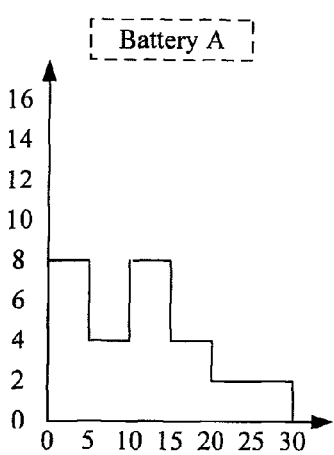
FIG. 5 illustrate a first charge profile.
Figure 6:
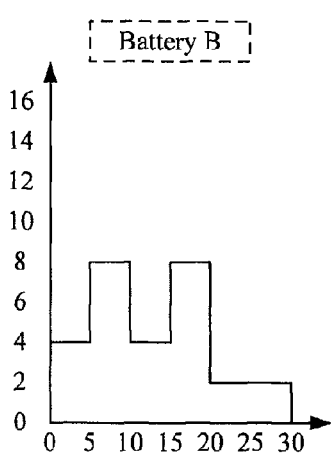
FIG. 6 illustrate a second charge profile, which is staggered with respect to the first charge profile of FIG. 5.
Figure 7:
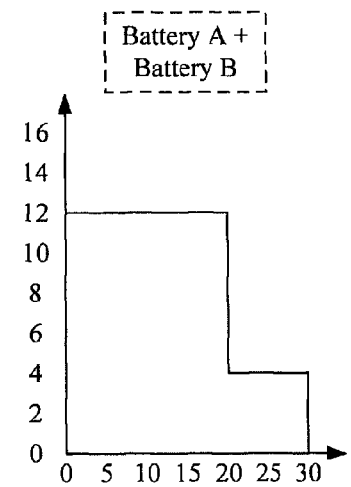
FIG. 7 illustrates an aggregation of the staggered first and second charge profiles from FIGS. 6 and 7.

For explanatory purposes, two non-limiting example staggered charge profiles are shown in connection with FIGS. 5, 6, and 7. As with FIGS. 1-3, the x-axis represents the charge time in units of minutes, the y-axis represents the charging current in units of Amperes (A), and the curve show the charge current as a function of charge time, and the curves represent the individual and aggregated charge profiles. For comparative purpose, the illustrated staggered charge profiles are for charging the Batteries A and B, which, as noted above, each have a charge capacity of twenty-four hundred (2400) milliamp hours (mAh), for thirty (30) minutes. Of course, staggered charge profiles can be used with chargers that can receive and charge N batteries, wherein N is a positive integer greater than one. In addition, charge times may differ from charge profile to charge profile.

From FIG. 5, a charge profile for the Battery A includes initially charging Battery A with eight (8) A of current for the first five (5) minutes. Concurrently, as shown in FIG. 6, a charge profile for the Battery B includes initially charging Battery B with four (4) A of current for the first five (5) minutes. For the next five (5) minutes, the charging current for the Battery A decreases to four (4) mAh, and the charging current for the Battery B increases to eight (8) mAh. In the illustrated example, this pattern repeats with the charging current for Battery A being eight (8) A of current for the third five (5) minutes and eight (8) mAh for the fourth five (5) minutes, and the charging current for Battery B being four (4) A of current for the third five (5) minutes and four (4) mAh for the fourth five (5) minutes. For the last ten (10) minutes, the charging current for both Batteries A and B decreases to two (2) mAh. Of course, other patterns are contemplated herein, and the illustrated pattern is not limiting.

Turning to FIG. 7, aggregately, using staggered charge profiles, the maximum charging current for fully charging both Batteries A and B is about twelve (12) mAh. As such, by using the staggered charge profiles of FIG. 2, relative to the charge profiles of FIG. 1, the charging circuitry need only draw a maximum of twelve (12) mAh to fully charge two twenty-four hundred (2400) milliamp hours (mAh), for a total charge capacity of forty-eight hundred 4600 mAh, in thirty (30) minutes. As such, the cost of the charging circuitry may be reduced relative to the cost of the charging circuitry that draws a maximum of sixteen (16) A, for fully charging the same batteries, Batteries A and B, over the same period of time.

The staggered charge profiles also may help control battery temperature without having to pulse (turn on and off) the charging current, thereby increasing energy efficiency relative to an approach in which the charging current is pulsed. In one instance, this is achieved by reducing the charging current rather than turning it off. Of course, in some embodiments the charging current may still be pulsed.

As noted above, the charging profiles shown in FIGS. 5-7, are examples provided for explanatory and comparative purposes and are not limiting. As such, it is to be understood that other staggered charging profiles are contemplated. For example, in another instance the charging profiles may result in a current draw or supply of less than or more than twelve (12) A. For example, the charging profiles may be staggered based on a maximum power or current, which may be twelve (12) A or less, draw of a charger. In another instance, the decrease and increase in charging current may differ from that shown in FIGS. 5 and. In another instance, there may be time intervals in which the charging current for only one of the batteries changes. In another instance, more than two batteries are charged based on corresponding different charge profiles.

Figure 8:
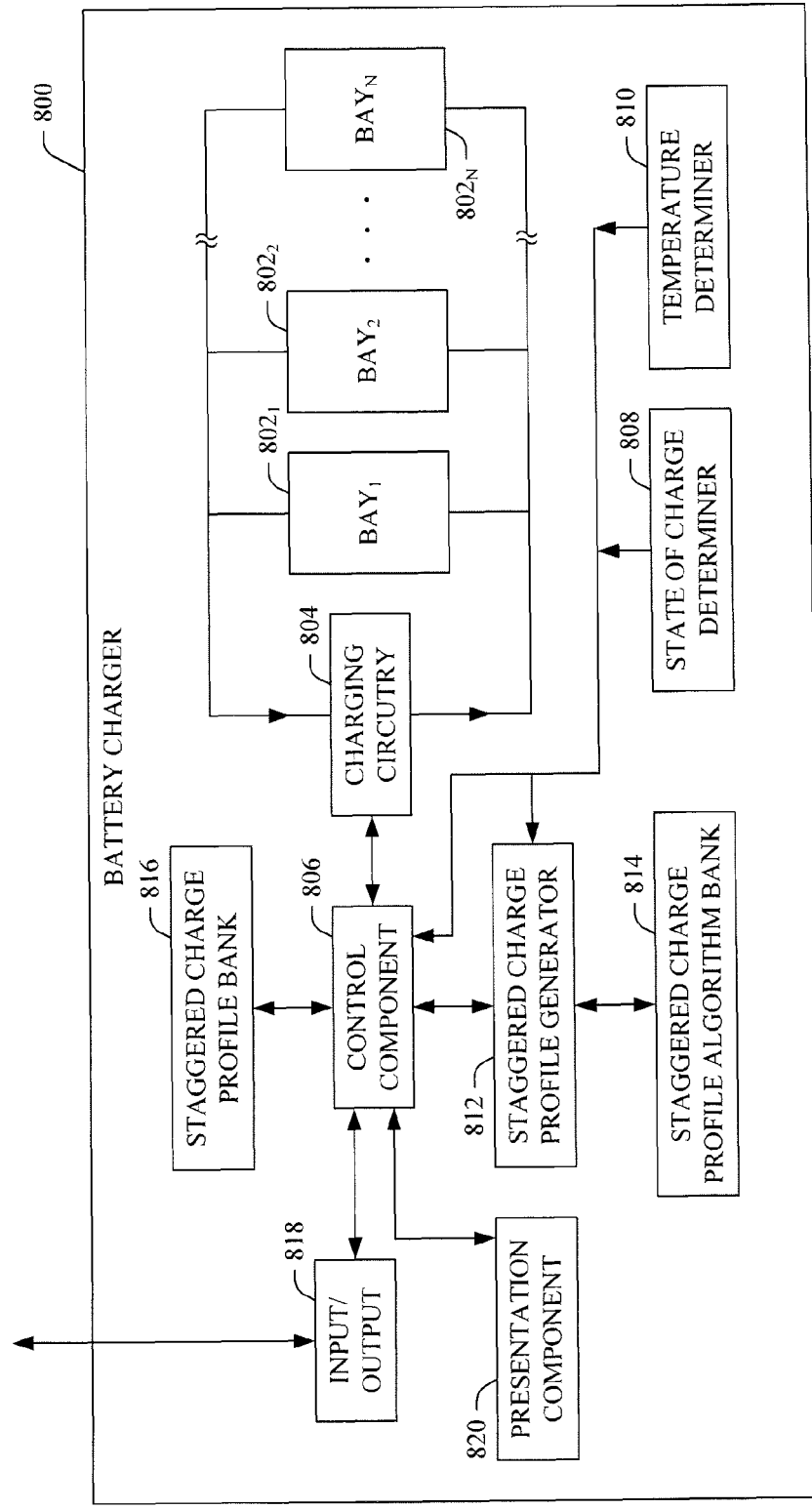
FIG. 8 illustrate an example battery charger that uses staggered battery charge profiles.

FIG. 8 illustrates an example battery charger 800, which uses staggered charge profiles when concurrently charging two or more batteries. The illustrated battery charger 800 includes N bays $802_1$, $802_2$, ..., $802_N$, wherein N is a positive integer equal to or greater than one (1). Each of the bays 802 is configured to receive a rechargeable (secondary) battery. It is to be appreciated that all of the bays 802 may be configured to receive the same size battery or interchangeably the same different size batteries, or one or more of the bays 802 may be configured to receive a battery size(s) that differs from one or more of the other bays 802.

Examples of suitable battery sizes include, but are not limited to, AAA, AA, C, D, N, 9-volt, button battery, lantern or any other size battery. Such batteries may be of any rechargeable chemistry, including, but not limited to, lithium iron disulfide ($Li/FeS_2$), nickel metal hydride (NiMH), nickel oxyhydroxide (NiOOH), zinc manganese dioxide ($Zn/MnO_2$), carbon zinc (CZn), zinc-manganese dioxide, Lithium ion (Li—Ion), nickel-cadmium (NiCd), zinc air, zinc air prismatic, as well as other chemistries. One or more of the bays 802 may additionally or alternatively be configured to receive and charge a batter pack, which includes multiple batteries electrically coupled together and integrated into a single pack.

The battery charger 800 further includes battery charging circuitry 804, which supplies a charging current to each of the bays 802 based on respective battery charge profiles. As such, the charging currents may all be the same or at least one of the charging currents may be different from the other charging currents during charging. For example, assuming at least two of the bays 802 have received a battery, for example, Batteries A and B, the charge current supplied to both of the bays 802 may be eight (8) A, or the charge current supplied to one of the bays 802 may be eight (8) A, while the charge current supplied to another one of the bays 802 may be four (4) A.

A control component 806 controls the charging circuitry 804. For instance, the control component 806 activates and deactivates the charging circuitry 804 so that the charging circuitry supplies a charging current or does not supply a charging current to the bays 802. In one instance, the control component 806 controls the charging circuitry 804 based on the staggered charge profiles. In another instance, the control component 806 controls the charging circuitry 804 by providing the staggered charge profiles to the charging circuitry 804, which supplies current to the bays 802 based on the staggered charge profile. In yet another instance, the control component 806 also considers the state of charge of the batteries as determined by a state of charge determiner 808 and/or a battery temperature determiner 810 when controlling the charging circuitry 804. The control component 806 can include or be a micro-processor, central processing unit (CPU), or other processing unit. Machine learning or the like may facilitate the control component 806 by determining, inferring, etc. suitable control based on classifiers, probabilities, cost functions, history, heuristics, etc.

A staggered charge profile generator 812 generates staggered (different) charge profiles for each battery inserted in the bays 802. As noted above, the staggered charge profiles may be based on various factors such as, but are not limited to, one or more of the charge capacity of each battery, the charge state of each battery, the charge time for each battery, the maximum current draw, the number of batteries being charge, the temperature of each battery, etc. In the example discussed in connection with FIGS. 5-7, the charger had a maximum current draw of twelve (12) A and the charge time was thirty (30) minutes, and the charge profiles were generated in accordance therewith such that the maximum aggregate charge current is twelve (12) or less during the charge time.

A staggered charge profile algorithm bank 814 stores one or more algorithms that may be used by the staggered charge profile generator 812. Such algorithms may take into account information such as user preferences, bay priorities that determine which bays are likely to include batteries that need to be charge faster than the batteries in lower priority bays, the charge mode (e.g., fast or slow charge), the state of charge of the batteries in the bays, the temperature of the batteries in the bays, etc.

A staggered charge profile bank 816 stores staggered charge profiles. Such profiles may have been generated by the staggered charge profile generator 812, uploaded from another source and/or downloaded by another source. In this manner, the control component 806 can use an already generated staggered charge profile if one is suitable or optimal for a particular set of batteries and/or configuration of inserted batteries and/or system settings. The machine learning may also help facilitate determining which stored profile, if any, to use.

An input/output component 818 provides a mechanism for receiving input from and/or conveying information to a source external to the battery charger 802. Such a source may be a human or a machine such as a robot, a computer, or the like. Examples of suitable input includes, but is not limited to, an input that turns the charger 800 on and off, an input indicative of a desired charge mode (e.g., fast charge, slow charge, etc.), an input indicative of a charge time, an input indicative of a maximum current draw, an input indicative of a bay priority, which may indicate an order in which a maximum charge current is supplied to the bays, as well as other inputs.

The output may include signals indicative of the state of charge of each battery, the input, messages such as error codes and/or other indicators, etc. Data indicative of the input, the output, and/or other information may also be presented via a presentation component 820, which may include one or more of a seven segment display, a liquid crystal display, one or more light emitting diodes, a flat panel display, and/or other visual device, and/or an audio device such as a speaker or the like. The input/output component 818 may include a push-button, slide, dial, audio activate, touch screen and/or other type of switch.

It is to be appreciated that in another embodiment, one or more of the state of charge component 808, the temperature component 810, the staggered charge profile algorithm bank 814, the staggered charge profile bank 816, the input/output component 818, and/or the presentation component 820 may be omitted. Moreover, in another embodiment, a battery chemistry identifier may is included and determines the chemistry of each battery, and this information can also be used in determining a suitable staggered charge profile. The identification may be made via the input/output component 818 and/or automatic measurement of the battery under one or more various load imparted on the battery by the charger 800 device, for example, via the battery response to changes in load in conjunction with battery open circuit voltage and closed circuit voltage.

It is also to be appreciated that the method and/or battery charger can be part of a dedicated battery charging device or integrated with one or more other devices such as with a lighting apparatus, an electrical apparatus, an automobile, a computer, etc. Of course, the battery charger can also include fault protection circuitry, short circuit detection circuitry, over current detection circuitry, as well as other circuitry employed in battery chargers.

The application has been described with reference to various embodiments. Modifications and alterations will occur to others upon reading the application. It is intended that the invention be construed as including all such modifications and alterations, including insofar as they come within the scope of the appended claims and the equivalents thereof.

What is claimed is:

1. A battery charging method, comprising:
generating a plurality of charge profiles, each for a different one of a plurality of batteries, wherein a charge profile indicates a charge current as a function of charge time, and at least two of the charge profiles have a different non-zero charge current at a same charge time such that the at least two charge profiles form a staggered charge profile; and
concurrently charging each of the plurality of batteries by continually supplying charge current that fluctuates between at least two non-zero current levels based on the staggered charge profile.

2. The method of claim 1, wherein the staggered charge profile is based on an available power drawn by a charger using the method.

3. The method of claim 1, wherein the staggered charge profile is based on an available charge current for charging the plurality of batteries.

4. The method of claim 1, wherein the staggered charge profile is based on a state of charge of the corresponding battery.

5. The method of claim 1, wherein the staggered charge profile is based on a temperature of the corresponding charging battery.

6. The method of claim 1, wherein the staggered charge profile is based on a temperature of at least one adjacent charging battery.

7. The method of claim 1, wherein the staggered charge profile is based on a number of battery charging bays being used to charge batteries.

8. The method of claim 1, wherein the staggered charge profile is based on a charge time.

9. The method of claim 1, wherein the staggered charge profile is based on a charging priority.

10. The method of claim 1, wherein at least one of the batteries includes one or more electrochemical cells.

11. The method of claim 1, wherein at least one of the batteries includes a capacitor.

12. The method of claim 1, wherein the plurality of charge profiles include a charging current that fluctuates over a charge interval based on factors.

13. The method of claim 12, wherein the factors include one or more of the charge capacity of the batteries, the charge state of the batteries, the charge time for the batteries, a power draw, a number of the batteries, temperature, and user defined charging parameters.

14. The method of claim 1, further comprising optimizing each of the plurality of charge profiles.

15. A battery charger, comprising:
a charge profile generator that generates a different charge profile for each of a plurality of batteries to be charged, wherein at least two of the charge profiles are staggered in that they include charge current profiles that differ from each other over time; and
charging circuitry that concurrently charges at least two batteries by continually supplying charge current that fluctuates between at least two non-zero current levels based on respective generated charge profiles.

16. The battery charger of claim 15, further including a state of charge determiner, wherein the charge profile generator generates the charge profiles based on a state of charge of at least one of the batteries.

17. The battery charger of claim 15, further including a battery temperature determiner, wherein the charge profile generator generates the charge profiles based on a temperature of at least one of the batteries.

18. The battery charger of claim 15, further including an algorithm bank that includes at least one algorithm used by the charge profile generator to generate the charge profiles.

19. The battery charger of claim 18, wherein the at least one algorithm is based on one or more of a charge capacity of each battery, a charge state of each battery, a charge time for each battery, a maximum current draw of the charger, a number of batteries being charged, and a temperature of each battery.

20. The battery charger of claim 15, wherein the charge profile generator generates the charge profiles based on a power draw of the battery charger.

\* \* \* \* \*